United States Patent Office 3,655,629
Patented Apr. 11, 1972

3,655,629
POLYCONDENSED ACID COMPOSITION AND PRODUCTION THEREOF
Masaki Takahara, 13 Sakurano-cho, 6-chome, Toyonaka-shi, Osaka-fu, Japan
No Drawing. Filed Jan. 14, 1970, Ser. No. 2,966
Int. Cl. C08f 3/60, 3/70, 3/80
U.S. Cl. 260—78.4 D                     11 Claims

ABSTRACT OF THE DISCLOSURE

A polycondensed acid composition soluble in alkali solution and having an acid value of 30 to 250 and a softening point of 0 to 150° C., which is obtained by polycondensing an olefinic hydrocarbon (having a boiling point ranging from 20 to 300° C. and being abundant in hydrocarbons of 5 to 11 carbon atoms) with an unsaturated carboxylic acid or its anhydride in the presence of a radical catalyst together with a dehydrating catalyst at 20 to 180° C. The resultant resinous product is useful as a paper sizing agent, an emulsifier for polymerization in synthetic rubber production, a resin for paint and printing ink, etc.

---

The present invention relates to a polycondensed acid composition and production thereof. More particularly, it relates to a polycondensed acid composition to be used in place of natural rosins and production thereof.

Natural rosins have heretofore been used as paper sizing agents, emulsifiers for polymerization in synthetic rubber production, resins for paint and printing ink, etc. They have, however, a variety of inherent drawbacks such as limited supply of the resources, difficult unification of the quality and deterioration in the storage.

In the course of the study seeking synthetic resinous materials which can be used in place of natural rosins but without said drawbacks, it has been found that the resinous product obtained by polycondensing an olefinic hydrocarbon with an unsaturated carboxylic acid or its anhydride in the presence of a radical catalyst and a dehydrating catalyst under certain conditions is suitable for such use. The resinous product is excellent in tackiness and well soluble in alkali solution. Hereupon, the combined use of said both catalysts is essential for production of the resinous materials provided with desired properties. When the radical catalyst is employed alone, the resultant product is much inferior to natural rosins in tackiness and not suitable for practical use in place of the latter. In case of using the dehydrating catalyst only, the resulting product is not soluble in water and limited in the field of use. Even when no catalyst is used, the polycondensation can proceed. But, the reaction rate is so markedly low as being not practically adopted. Further, the product is quite inferior in tackiness.

A basic object of the present invention is to provide a polycondensed acid composition to be used in place of natural rosins. Another object of this invention is to provide a resinous product excellent in tackiness and well soluble in alkali solution. A further object of the invention is to provide a process for preparing a resinous product from an olefinic hydrocarbon and an unsaturated carboxylic acid or its anhydride. These and other objects will be apparent to those conversant with the art to which the present invention pertains from the subsequent descriptions.

According to the present invention, the polycondensed acid composition is obtained by polycondensing an olefinic hydrocarbon with an unsaturated carboxylic acid or its anhydride in the presence of a radical catalyst together with a dehydrating catalyst at 10 to 180° C.

As the starting olefinic hydrocarbon, there may be employed a single component. From the industrial viewpoint, however, the use of a mixture of olefinic hydrocarbons (e.g. ethylene bottom, coke oven gas light oil) obtained in the process of petroleum refining, petroleum cracking, coal carbonization or the like and available in low costs is recommended. Specifically, a hydrocarbon fraction resulting from treatment of petroleum or coal, having a boiling point ranging from 20 to 300° C. and being abundant in hydrocarbons of 5 to 11 carbon atoms is favorably employed.

Examples of the unsaturated carboxylic acid are maleic acid, fumaric acid, crotonic acid, itaconic acid, acrylic acid, methacrylic acid, etc. These unsaturated carboxylic acids may be utilized in the form of anhydrides.

As the radical catalyst, there may be used the one usually employed as an initiator in radical polymerization such as acetyl peroxide, lauroyl peroxide, benzoyl peroxide cumene hydroperoxide, sodium perborate, potassium persulfate or azobisisobutyronitrile.

Examples of the dehydrating catalyst are sulfuric acid, hydrogen chloride, phosphoric acid, pyrophosphoric acid, anhydrous cupric sulfate, anhydrous ferric sulfate, zinc chloride, potassium pyrosulfate, p-toluenesulfonic acid, aluminum chloride, boron trifluoride, etc.

In addition to the said two essential catalysts, there may be also incorporated a polymerization regulator, if needed. Examples of the polymerization regulator are sodium thiosulfate, sodium sulfite, methyl mercaptan, ethyl mercaptan, thioglycol, thioglycolic acid, thiopropionic acid, thiourea, 1,3-diethylthiourea, etc.

The weight ratio of the reactants and the catalysts is dependent on various factors. Usually, 0.5 to 20 parts by weight of the unsaturated carboxylic acid or its anhydride, 0.01 to 5 parts by weight of the radical catalyst and 0.01 to 20 parts by weight of the dehydrating catalyst may be employed to 100 parts by weight of the olefinic hydrocarbon.

The polymerization reaction may be conducted in a per se conventional procedure, normally under an atmospheric or elevated pressure at a temperature ranging from 20 to 180° C. Although the reaction period is much varied with other reaction conditions, it is ordinarily from 1 to 36 hours.

The resinous product as above obtained is well soluble in alkali solution and has an acid value of 30 to 250 and a softening point of 0 to 150° C.

When desired, the thus obtained resinous polymer may be further subjected to secondary polymerization, which will raise the softening point of the product. The polymerization reaction may be carried out by treating the above obtained polymer in the presence of an ionic catalyst (e.g. boron trifluoride, aluminum chloride, zinc chloride) under an atmospheric or elevated pressure at a temperature ranging from 20 to 250° C. for 1 to 36 hours. In this case, an aldehyde (e.g. formaldehyde, paraformaldehyde, acrolein) or a formaldehydehydrocarbon resin (e.g. formaldehyde-methaxylene copolymer, formaldehyde-paraxylene copolymer) may be, if desired, incorporated in to the reaction system.

By saponifying the resinous product with an alkali in a per se conventional procedure, there is obtained the alkali metal salt (e.g. sodium, potassium, calcium salts), which is per se useful as a paper sizing agent, an emulsifier for polymerization in synthetic rubber production, a resin for paint and printing ink, etc. In order to realize a better dispersibility, the resinous product may be admixed with a fatty acid (e.g. bean fatty acid, tallow fatty acid, tall oil fatty acid, rice oil fatty acid) or a fatty oil (e.g. bean oil, tall oil, rice oil), followed by saponification as stated above. The preferred mixing ratio of the resinous product and the fatty acid or fatty oil is from 60:40 to 90:10.

Practical and presently-preferred embodiments of the present invention are illustratively shown in the following examples.

EXAMPLE 1

To a mixture of 100 g. of cracked gasoline (B.P., 140 to 280° C.; bromine value, 97) and 10 g. of maleic anhydride, there are added 0.1 g. of azobisisobutyronitrile and 0.01 g. of boron trifluoride, and the resulting mixture is heated from 50 to 130° C. in 8 hours and concentrated under reduced pressure to give 60 g. of the pale yellow, resinous product having a softening point of 30 to 60° C. and an acid value of 160. The resinous product is stirred with an aqueous solution of sodium hydroxide and concentrated to make a concentration of about 30% of the sodium salt. The resultant solution is as such used as a paper sizing agent.

When the reaction is carried out in the same manner as above but using no catalyst, there are obtained 10 g. of the resinous product having a melting point of about 230° C. and being quite inferior in tackiness.

EXAMPLE 2

As in Example 1, the polymerization is carried out but using 0.1 g. of potassium persulfate and 1 g. of aluminum chloride as the catalysts at a temperature from 50 to 130° C. for 8 hours. The yield of the resinous product is 40 g. Softening point, 60 to 80° C. Acid value, 135.

EXAMPLE 3

As in Example 1, the polymerization is carried out but using 0.1 g. of sodium perborate and 0.1 g. of boron trifluoride as the catalysts at a temperature from 20 to 130° C. for 8 hours. The yield of the resinous product is 37 g. Softening point, 60 to 70° C. Acid value, 120.

EXAMPLE 4

To a mixture of 100 g. of cracked gasoline (B.P., 140 to 280° C.; bromine value, 97) and 5 g. of maleic anhydride, there are added 0.1 g. of azobisisobutyronitrile and 0.01 g. of boron trifluoride, and the resulting mixture is heated from 50 to 130° C. in 8 hours. The reaction mixture is stirred with an aqueous solution of sodium hydroxide and separated into two layers. The water layer is concentrated to make a concentration of about 30% of the sodium salt. The resultant solution (100 g.) is as such used as a paper sizing agent. The free acid obtained by neutralizing the sodium salt shows a softening point of 30 to 60° C. and an acid value of 130.

EXAMPLE 5

To a mixture of 100 g. of cracked gasoline (B.P., 140 to 280° C.; bromine value, 97) and 5 g. of acrylic acid, there are added 0.1 g. of azobisisobutyronitrile and 0.05 g. of boron trifluoride, and the resulting mixture is heated from 50 to 180° C. in 24 hours and concentrated under reduced pressure to give 22 g. of the pale yellow, resinous product having a softening point of 50 to 70° C. and an acid value of 180. The resinous product is stirred with an aqueous solution of sodium hydroxide and concentrated to make a concentration of about 30% of the sodium salt. The resultant solution is as such used as a paper sizing agent.

EXAMPLE 6

To a mixture of 100 g. of cracked gasoline (B.P., 140 to 280° C.; bromine value, 97) and 10 g. of maleic anhydride, there are added 0.1 g. of azobisisobutyronitrile and 1.5 g. of aluminum chloride, and the resulting mixture is heated from 50 to 130° C. in 20 hours. The reaction mixture is stirred with an aqueous solution of sodium hydroxide and separated into two layers. The water layer is concentrated to make a concentration of about 30% of the sodium salt. The resultant solution (160 g.) is as such used as a paper sizing agent. The free acid obtained by neutralizing the sodium salt shows a softening point of 65 to 90° C. and an acid value of 203.

EXAMPLE 7

To a mixture of 100 g. of cracked gasoline (B.P. 140 to 280° C.; bromine value, 97), 5 g. of maleic anhydride and 5 g. of tall rosin, there are added 0.1 g. of azobisisobutyronitrile, 0.01 g. of boron trifluoride and 1 g. of thioglycolic acid, and the resulting mixture is heated from 50 to 130° C. in 8 hours and concentrated under reduced pressure to give 47 g. of the pale yellow, resinous product having a softening point of about 15° C. and an acid value of 100.

EXAMPLE 8

To a mixture of 200 g. of cracked gasoline (B.P., 140 to 280° C.; bromine value, 203), 10 g. of maleic anhydride and 10 g. of the resinous material obtained as in Example 1, there are added 0.1 g. of azobisisobutyronitrile and 0.05 g. of boron trifluoride, and the resulting mixture is heated from 50 to 150° C. in 15 hours and concentrated under reduced pressure to give 95 g. of the pale yellow, resinous product having a softening point of about 90° C. and an acid value of 105.

EXAMPLE 9

To a mixture of 100 g. of a mixed oil consisting of coke oven gas light oil and tar light oil ($C_7$–$C_{11}$ fractions) and 5 g. of maleic anhydride, there are added 0.2 g. of azobisisobutyronitrile and 0.1 g. of boron trifluoride, and the resulting mixture is heated from 38 to 80° C. in 8 hours and concentrated under reduced pressure to give 14 g. of the pale yellow, resinous product having a softening point of about 150° C. and an acid value of 250.

EXAMPLE 10

A mixture of 100 g. of the resinous material obtained as in Example 1, 20 g. of methaxylene-formaldehyde resin (oxygen content, 11%; molecular weight, 550) and 0.3 g. of p-toluenesulfonic acid is heated to 200° C. and kept at the same temperature for 1 hour to give 115 g. of the pale yellow, resinous product having a softening point of about 230° C. and an acid value of 60.

EXAMPLE 11

To a mixture of 100 g. of cracked gasoline (B.P., 140 to 280° C.; bromine value, 97) and 5 g. maleic anhydride, there are added 0.2 g. of azobisisobutyronitrile and 0.01 g. of boron trifluoride, and the resulting mixture is heated from 50 to 150° C. in 36 hours and concentrated under reduced pressure to give 35 g. of the pale yellow, resinous product having a softening point of 60 to 80° C. and an acid value of 32. The resinous product is dissolved in an aqueous solution of sodium hydroxide, 33 g. of calcium chloride are added thereto and double decomposition is effected, whereby the calcium salt of the resinous product is obtained.

EXAMPLE 12

To a mixture of 100 g. of cracked gasoline (B.P. 140 to 280° C.; bromine value, 97) and 5 g. of maleic anhydride, there are added 5 g. of petroleum resin, 0.1 g. of azobisisobutyronitrile and 1.5 g. of aluminum chloride, and the resulting mixture is heated from 50 to 130° C. in 8 hours and concentrated under reduced pressure to give 38 g. of the pale yellow, resinous product having a softening point of about 80° C. and an acid value of 115.

EXAMPLE 13

A mixture of 60 g. of the resinous material obtained as in Example 1, 40 g. of bean oil fatty acid and 25 g. of potassium hydroxide in 300 g. of water is heated at 100° C. for 1 hour, and the resulting mixture is as such used as a paper sizing agent.

EXAMPLE 14

Using the following materials, the polymerization is carried out at 50° C. in a per se conventional manner to produce styrene-butadiene copolymer:

| Materials: | Parts by weight |
|---|---|
| Butadiene | 71.5 |
| Styrene | 28.5 |
| Water | 180 |
| Emulsifier | 4.68 |
| Potassium persulfate | 0.30 |
| Dodecyl mercaptan | 0.5 |

The conversion rates (percent) at the designed times are shown in the following table:

TABLE

| Emulsifier | Time (hours) | | | | | |
|---|---|---|---|---|---|---|
| | 3 | 6 | 9 | 12 | 15 | 18 |
| Commercially available sodium salt of rosin acid | 12 | 30 | 40 | 67 | 77 | 92 |
| Sodium salt of resinous material in Example 4 | 16 | 34 | 50 | 70 | 80 | 92 |
| Sodium salt of resinous material in Example 5 | 12 | 32 | 42 | 65 | 75 | 90 |
| Sodium salt of resinous material in Example 6 | 10 | 32 | 40 | 66 | 76 | 92 |

As is clearly seen from the above table, the sodium salt of the resinous material of this invention exhibits an excellent emulsifying action and affords a good conversion rate in polymerization reaction as well as commercially available sodium salt of rosin acid does.

EXAMPLE 15

Using the following materials, the polymerization is carried out at 40° C. for 10 hours in a per se conventional manner to produce acrylonitrile-butadiene copolymer:

| Materials: | Parts by weight |
|---|---|
| Butadiene | 74 |
| Acrylonitrile | 26 |
| Water | 180 |
| Sodium salt of resinous material in Example 6 or commercially available sodium salt of rosin acid | 4 |
| Dodecyl mercaptan | 0.5 |
| Potassium persulfate | 0.3 |
| Sodium pyrophosphate | 0.3 |
| Sodium hydroxide | 0.1 |

The conversion rate in case of using sodium salt of the resinous material in Example 6 is 75%, whereas that in case of using commercially available sodium salt of rosin acid is 72%.

EXAMPLE 16

The test on the paper sizing effect of the alkali metal salt of the resinous material obtained as in Examples 5, 6 and 13 is carried out as follows:

TEST CONDITIONS

| | |
|---|---|
| Paper pulp employed | L-BKP. |
| Beating degree | SR 35°. |
| Concentration of sizing agent | 0.5%, 1% or 1.5%. |
| pH (adjusted with aluminum sulfate) | 4.5. |
| Measurement of sizing degree | Steckhit method. |
| Sheet machine | TAPPI Standard Machine. |

Results:
Blurring time with ink (seconds)

| Sizing agent | Concentration, percent | | |
|---|---|---|---|
| | 0.5 | 1 | 1.5 |
| Commercially available liquid sizing agent made of natural rosin | 16 | 26 | 29 |
| Alkali metal salt of resinous material in: | | | |
| Example 5 | 16 | 27 | 29 |
| Example 6 | 17 | 29 | 32 |
| Example 13 | 22 | 36 | 41 |

What is claimed is:

1. A process for preparing polycondensed acid compositions which comprises polycondensing a hydrocarbon material selected from the group consisting of single olefin hydrocarbons having a boiling point ranging from 20 to 300° C. and a mixture thereof, with a polymerizable ethylenically unsaturated aliphatic carboxylic monomer in the presence of a radical catalyst and a dehydrating catalyst at 20° to 180° C., the weight ratio of the hydrocarbon material, the unsaturated carboxylic monomer, the radical catalyst and the dehydrating catalyst being 100:0.5 to 20:0.01 to 5 and 0.01 to 20, to give a resinous product soluble in an alkali solution and having an acid value of 30 to 250 and a softening point of 0 to 150° C.

2. The process according to claim 1 wherein the polycondensation is carried out in the presence of a polymerization regulator.

3. The process according to claim 1 wherein the unsaturated carboxylic monomer is maleic anhydride.

4. The process according to claim 1 wherein the radical catalyst is azobisisobutyronitrile.

5. The process according to claim 1, followed by treatment with an alkali material.

6. The process according to claim 1 wherein the radical catalyst and the dehydrating catalyst are employed in a weight ratio of 0.1 to 0.2:0.01 to 1.5.

7. The process according to claim 1 wherein the radical catalyst is an initiator for radical polymerization capable of effecting the polycondensation reaction at temperatures of 20° to 180° C.

8. The process according to claim 7 wherein said radical catalyst is selected from the group consisting of acetyl peroxide, lauroyl peroxide, benzoyl peroxide, cumene peroxide, sodium perborate, potassium persulfate and azobisisobutyronitrile.

9. The process according to claim 1 wherein said dehydrating catalyst is selected from the group consisting of sulfuric acid, hydrogen chloride, phosphoric acid, pyrophosphonic acid, anhydrous cupric sulfate, anhydrous ferric sulfate, zinc chloride, potassium pyrosulfate, p-toluene sulfonic acid, aluminum chloride, and boron trifluoride.

10. The process according to claim 1 wherein said hydrocarbon material is a mixture of olefinic hydrocarbons abundant in hydrocarbons of 5 to 11 carbon atoms.

11. The process according to claim 1 wherein said carboxylic monomer is selected from the group consisting of maleic acid, fumaric acid, crotonic acid, itaconic acid, acrylic acid, and methacrylic acid, and anhydrides thereof.

References Cited
UNITED STATES PATENTS

| | | | |
|---|---|---|---|
| 2,824,859 | 2/1958 | Fasce | 260—78.5 |
| 3,532,672 | 10/1970 | Masaki Takahara | 260—78.5 |

HARRY WONG, Jr., Primary Examiner

J. KIGHT III, Assistant Examiner

U.S. Cl. X.R.

260—78.4 R, 88.1 PC, 88.2 S